US012658392B2

(12) United States Patent (10) Patent No.: US 12,658,392 B2
Maezawa et al. (45) Date of Patent: Jun. 16, 2026

(54) IN-VEHICLE CONTROL DEVICE

(71) Applicant: MITSUBISHI JIDOSHA KOGYO KABUSHIKI KAISHA, Tokyo (JP)

(72) Inventors: Hirokazu Maezawa, Tokyo (JP); Shohei Kawano, Tokyo (JP); Shinji Akiyoshi, Tokyo (JP); Yoshinori Tomita, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 18/852,122

(22) PCT Filed: Mar. 30, 2022

(86) PCT No.: PCT/JP2022/016276
§ 371 (c)(1),
(2) Date: Sep. 27, 2024

(87) PCT Pub. No.: WO2023/188192
PCT Pub. Date: Oct. 5, 2023

(65) Prior Publication Data
US 2025/0210291 A1 Jun. 26, 2025

(51) Int. Cl.
H01H 47/00 (2006.01)
B60L 3/00 (2019.01)
B60L 3/04 (2006.01)

(52) U.S. Cl.
CPC ......... H01H 47/002 (2013.01); B60L 3/0023 (2013.01); B60L 3/0069 (2013.01);
(Continued)

(58) Field of Classification Search
CPC ........... H01H 47/002; H01H 2047/003; H01H 2047/006; B60L 3/0023–0084; B60L 3/04; B60L 2270/20
See application file for complete search history.

(56) References Cited

U.S. PATENT DOCUMENTS

2006/0224360 A1* 10/2006 Kishimoto ............ B60L 3/0023
702/183
2007/0221627 A1* 9/2007 Yugou .................. H01H 47/002
218/136
(Continued)

FOREIGN PATENT DOCUMENTS

JP 59-194324 A 11/1984
JP 63-264837 A 11/1988
(Continued)

OTHER PUBLICATIONS

European Communication pursuant to Article 94(3) EPC for European Application No. 22 935 337.0, dated Nov. 24, 2025.
(Continued)

*Primary Examiner* — Rexford N Barnie
*Assistant Examiner* — David A Shiao
(74) *Attorney, Agent, or Firm* — Birch, Stewart, Kolasch & Birch, LLP

(57) ABSTRACT

An in-vehicle control device (10) includes a determination unit (11) that determines whether or not a target contactor (21) for connecting and disconnecting a high-voltage circuit of a battery (2) installed in a vehicle is likely to have sticking after the high-voltage circuit is used; and a vibration control unit (13) that performs a vibration control including a target vibration control to repeatedly turn on and off the target contactor (21) when the determination unit (11) determines that the target contactor (21) is likely to have sticking, whereby attempt to remove a transient short circuiting of the target contactor.

6 Claims, 5 Drawing Sheets

(52) U.S. Cl.
CPC ............. *B60L 3/04* (2013.01); *B60L 2270/20* (2013.01); *H01H 2047/003* (2013.01)

(56) References Cited

U.S. PATENT DOCUMENTS

| | | | | |
|---|---|---|---|---|
| 2008/0002322 | A1* | 1/2008 | Hirasawa | B60L 3/0046 361/79 |
| 2010/0296204 | A1* | 11/2010 | Ichikawa | B60L 3/0046 361/15 |
| 2014/0354054 | A1* | 12/2014 | Katou | H02J 7/865 307/43 |
| 2015/0115740 | A1* | 4/2015 | Miura | H01H 47/002 307/125 |
| 2016/0243954 | A1 | 8/2016 | Moro et al. | |
| 2020/0144840 | A1* | 5/2020 | Masuda | B60L 1/003 |
| 2020/0317076 | A1* | 10/2020 | Wang | B60L 3/0023 |
| 2020/0384866 | A1 | 12/2020 | Tagaya et al. | |
| 2020/0411265 | A1* | 12/2020 | Fujita | H01H 3/001 |
| 2021/0170880 | A1* | 6/2021 | Tokitsu | H01H 1/605 |
| 2021/0284028 | A1* | 9/2021 | Nozaki | B60K 6/48 |

FOREIGN PATENT DOCUMENTS

| | | |
|---|---|---|
| JP | 2006-278210 A | 10/2006 |
| JP | 2018-156859 A | 10/2018 |
| JP | 2020-39220 A | 3/2020 |
| JP | 2020-202605 A | 12/2020 |

OTHER PUBLICATIONS

Extended European Search Report for European Application No. 22935337.0, dated Apr. 10, 2025.

International Preliminary Report on Patentability and Written Opinion of the International Searching Authority for International Application No. PCT/JP2022/016276, dated Oct. 10, 2024, with English translation.

The International Search Report (PCT/ISA/210) issued in PCT/JP2022/016276, mailed on Jun. 14, 2022.

The Written Opinion of the International Searching Authority (PCT/ISA/237) issued in PCT/JP2022/016276, mailed on Jun. 14, 2022.

* cited by examiner

IN-VEHICLE CONTROL DEVICE

TECHNICAL FIELD

The present disclosure relates to an in-vehicle control device that controls contactors for connecting and disconnecting a high-voltage circuit of a battery installed in a vehicle.

BACKGROUND ART

Conventionally, electromagnetic contactors, called contactors, for disconnecting the connection between a battery and load devices (such as an inverter) in emergencies are provided in a high-voltage circuit of the battery in electrically-powered vehicles, such as electric vehicles (EVs), hybrid electric vehicles (HEVs), and plug-in hybrid electric vehicles (PHEVs), which allow for external charging or external power supply. The contactors are controlled to be turned on or off by an in-vehicle control device.

It is known that such contactors are checked to determine whether sticking failure has occurred or not when the system is stopped (for example, when the ignition switch is turned off by the driver). For example, Patent Document 1 discloses a power supply system that detects the occurrence of a sticking failure of each of multiple contactors when the system is stopped by determining whether or not the voltage of a smoothing capacitor provided in a load device has changed.

PRIOR ART DOCUMENT

Patent Document

[Patent Document 1] JP 2020-202605 A

SUMMARY OF INVENTION

Technical Problems

In the sticking failure detection disclosed in Patent Document 1, sticking failures are also erroneously detected when the voltage does not change due to reasons other than a sticking failure, such as when the contact state has been maintained because parts inside the contactor have misaligned, or when a contactor cannot be temporarily turned off due to thermal expansion of an electromagnetic coil in the contactor. Such a temporary (transient) short circuit of the contactor (where the conduction of the wire in which the contactor is interposed cannot be shut) can be removed once the cause of the short circuit (such as the misalignment or thermal expansion) is eliminated. Therefore, it is desirable for an in-vehicle control device to have controls for removing such transient short circuits of the contactors.

The in-vehicle control device of the present disclosure has been conceived of in light of such a problem, and an object thereof is to remove transient short-circuiting of a contactor. It is to be noted that this object is not limiting, and it is another object of the present disclosure to provide effects and advantages which are derived from each of the elements described below in the DESCRIPTION OF EMBODIMENTS and are not achieved by the conventional art.

Solution to Problems

The disclosed in-vehicle control device can be embodied as an aspect or application example to be disclosed below, and solves at least a part of the problem described above.

(1) The in-vehicle control device disclosed therein includes a determination unit that determines whether or not a target contactor for connecting and disconnecting a high-voltage circuit of a battery installed in a vehicle is likely to have sticking after the high-voltage circuit is used; and a vibration control unit that performs a vibration control including a target vibration control to repeatedly turn on and off the target contactor when the determination unit determines that the target contactor is likely to have sticking.

(2) Preferably, the high-voltage circuit includes a first contactor interposed on one of positive or negative sides, a second contactor interposed on the other of the positive or negative sides, and a precharge contactor connected in parallel with the first contactor and in series with a resistor. In this case, preferably, the target contactor is the first contactor, and the vibration control includes a non-target vibration control to repeatedly turn the precharge contactor on and off before the target vibration control is performed.

(3) Preferably, the vehicle includes a capacitor connected to the battery via each of the first contactor and the second contactor. In this case, preferably, the in-vehicle control device further includes a voltage equalization control unit that equalizes a voltage of the capacitor with a voltage of the battery by turning on the precharge contactor before the vibration control unit performs the vibration control when the determination unit determines that the target contactor is likely to have sticking.

(4) Preferably, the vibration control unit keeps the target contactor turned on while the non-target vibration control is being performed and keeps the precharge contactor turned on while the target vibration control is being performed. In this case, preferably, the determination unit determines again whether the target contactor is likely to have sticking or not after the vibration control unit performs the vibration control.

(5) Preferably, the vibration control unit performs the vibration control multiple times.

(6) Preferably, the in-vehicle control device further includes a driving control unit that makes the vehicle ready for driving in response to receiving a start signal requesting the vehicle to start driving. In this case, preferably, the vibration control unit stops the vibration control in response to receiving the start signal, and the driving control unit makes the vehicle ready for driving after the vibration control is stopped and controls the vehicle according to an operation by a user.

(7) Preferably, the in-vehicle control device further includes an off control unit that performs an off control to prohibit current conduction to the target contactor for a given period of time. In this case, preferably, the off control unit performs the off control when the determination unit determines again that the target contactor is likely to have sticking.

(8) Preferably, the in-vehicle control device further includes a driving control unit that makes the vehicle ready for driving in response to receiving a start signal requesting the vehicle to start driving. In this case, preferably, the off control unit stops the off control in response to receiving the start signal, and the driving control unit makes the vehicle ready for driving after the off control is stopped and controls the vehicle according to an operation by the user.

Advantageous Effects

According to the disclosed in-vehicle control device, transient short-circuiting of the contactor can be removed.

DESCRIPTION OF EMBODIMENTS

An in-vehicle control device as an embodiment will now be described with reference to the drawings. The following embodiment is merely exemplary and is not intended to exclude various modifications to and applications of techniques not explicitly described in the following embodiment. Each configuration of the present embodiment can be variously modified without departing from the gist thereof. In addition, they can be selected as necessary, or they can be combined as appropriate.

1. OVERALL CONFIGURATION

Figure 1:
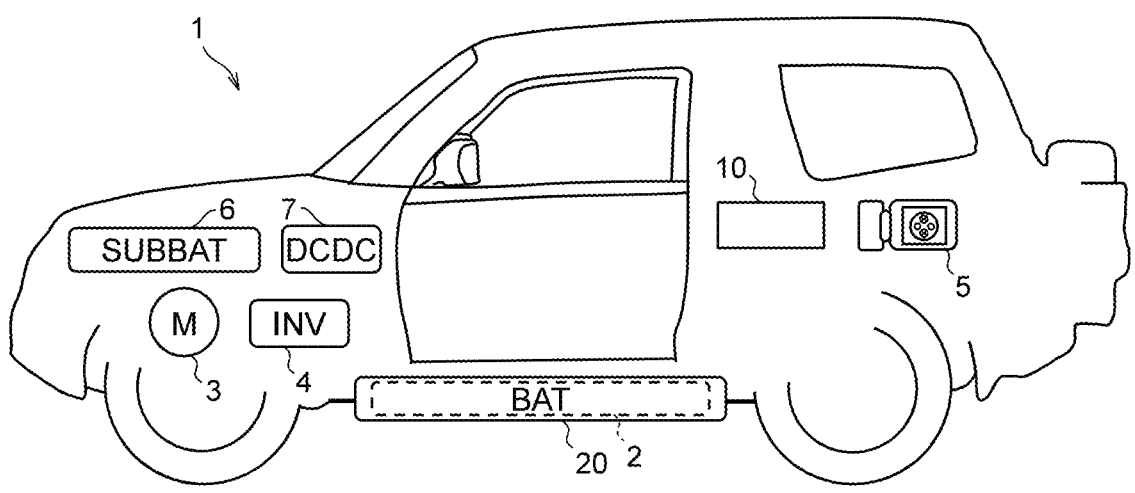
FIG. 1 is a schematic diagram of a vehicle having an in-vehicle control device according to one embodiment applied thereto.
Figure 2:
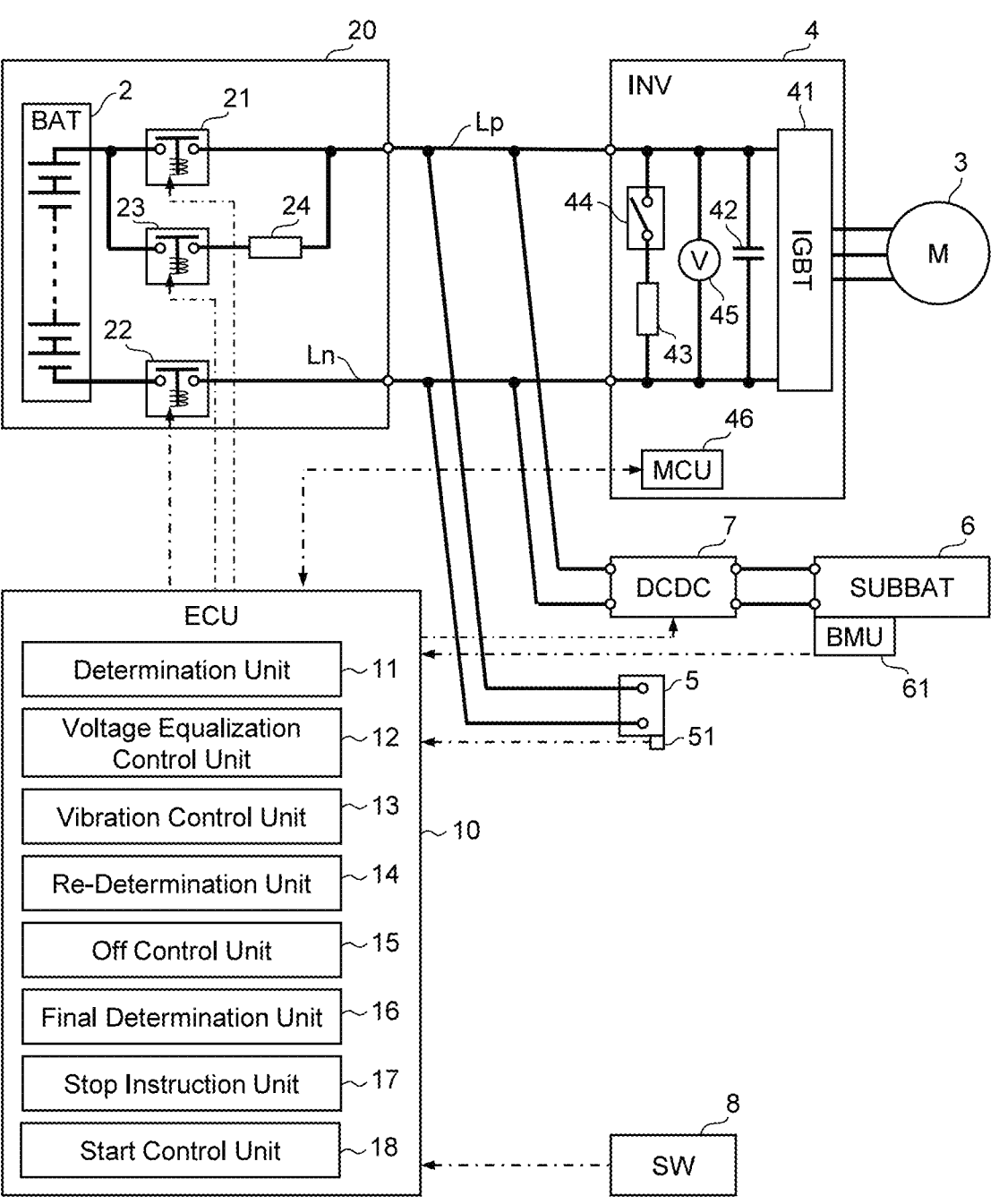
FIG. 2 is a diagram illustrating a circuit diagram indicating the electrical connections between a battery and other devices in the vehicle illustrated in FIG. 1, together with a block diagram of the in-vehicle control device illustrated in FIG. 1.

FIG. 1 is a schematic diagram of a vehicle 1 having an in-vehicle control device 10 (hereinafter referred to as "the ECU 10") according to the present embodiment applied thereto. FIG. 2 is a diagram illustrating a circuit diagram indicating the electrical connections between a battery 2 and other devices installed in the vehicle 1, together with a block diagram of the in-vehicle control device 10.

As illustrated in FIG. 1, the vehicle 1 is an electrically-powered vehicle (such as an electric vehicle or a plug-in hybrid vehicle) provided with a drive motor 3 powered by the battery 2 as the power source. As illustrated in FIG. 2, the vehicle 1 is provided with contactors 21 to 23 to disconnect a high-voltage circuit (DC circuit) between the battery 2 and other devices in emergencies. The ECU 10 has the functions to control these contactors 21 to 23 to turn on and off and to determine whether at least one of the contactors 21 to 23 is likely to have sticking or not after the high-voltage circuit of the battery 2 is used. Here, the expression "after the high-voltage circuit is used" refers to the period following a series of processes (one startup cycle) in the vehicle 1 involving the charging or discharging of the battery 2, such as after driving the vehicle 1, after charging to the battery 2 by an external charger, or after external power supply.

The battery 2 is a secondary battery such as a lithium-ion secondary battery or a nickel-metal hydride battery and is, for example, placed under the floor of the vehicle 1. In the present embodiment, the battery pack 20 including the battery 2 is provided with the contactors 21 to 23 described above. Here, three contactors are provided, namely, a first contactor 21 and a second contactor 22 that are arranged on the positive and negative sides of the high-voltage circuit of the battery 2, respectively, and a precharge contactor 23 that mitigates an inrush current to the high-voltage circuit.

The three contactors 21 to 23 are each normally excitation contactors having a movable contact, a fixed contact, and an electromagnetic coil. The contactors 21 to 23 are controlled to be on (connected state, closed state) when the electromagnetic coil is excited in response to receiving a control signal from the ECU 10. Conversely, in the absence of control signals, the electromagnetic coil is controlled to be unexcited, placing the contactor to be off (disconnected state, open state).

The first contactor 21 is interposed in the electrical line Lp on the positive side (hereinafter, referred to as "positive-side electrical line Lp") of the high-voltage circuit, and the second contactor 22 is interposed on the negative side (hereinafter, referred to as "negative-side electrical line Ln") of the high-voltage circuit. The precharge contactor 23 is connected in parallel with the first contactor 21 and in series with a precharge resistor 24 (resistor). The precharge contactor 23 is configured to be connected slightly before the first contactor 21 is connected when the high-voltage circuit is started to be used, so that the precharge resistor 24 prevents an excessive current flowing into the high-voltage circuit. The precharge contactor 23 is disconnected after a given startup time duration Tsu elapses after the start of the use of the high-voltage circuit. Here, the expression "when the high-voltage circuit is started to be used" refers to, for example, the start of a series of processes (one startup cycle) in the vehicle 1 involving charging or discharging of the battery 2, such as when the vehicle 1 starts driving, when external charging is started, or when an external power supply is started. The startup time duration Tsu is the time duration required to charge a capacitor 42, which will be described later, provided in the high-voltage circuit, and is set, for example, from one to several seconds.

The drive motor 3 is an AC motor-generator that has both the function of rotationally driving the wheels (e.g., front wheels) using electric power from the battery 2 and the function of regenerating electric power using the inertia torque of the wheels. In the present embodiment, the drive motor 3 is disposed on the front side of the vehicle as illustrated in FIG. 1, but it may also be disposed on the rear side of the vehicle. In other words, the drive motor 3 may be configured to rotationally drive the rear wheels of the vehicle. Alternatively, the vehicle 1 may be a four-wheel-drive vehicle provided with two drive motors 3, one for driving the front wheels and the other for driving the rear wheels.

As illustrated in FIG. 2, an inverter 4 is interposed in the circuit connecting the drive motor 3 and the battery 2. The contactors 21 to 23 described above are interposed between the battery 2 and the inverter 4. The inverter 4 includes, for example, an inverter circuit 41, a smoothing capacitor 42 (hereinafter, simply referred to as "capacitor 42"), a discharge resistor 43, a discharge switch 44, a voltmeter 45, and a motor control unit (MCU) 46.

The inverter circuit 41 is connected to the positive-side line Lp and the negative-side line Ln of the high-voltage circuit. The inverter circuit 41 is a three-phase bridge circuit including multiple switching elements such as insulated gate bipolar transistors (IGBTs). By intermittently switching the connection states of these switching elements, AC power to drive the drive motor 3 is generated.

The capacitor 42 is configured to smooth out noises generated by the switching in the inverter circuit 41 and is connected to the positive-side line Lp and the negative-side line Ln so as to be in parallel with the inverter circuit 41. The discharge resistor 43 is configured to discharge the electric charge stored in the capacitor 42 after the high-voltage circuit is used, and it is connected in parallel with the capacitor 42. The discharge switch 44 is configured to connect the discharge resistor 43 to the high-voltage circuit after the high-voltage circuit is used, and is connected in series with the discharge resistor 43.

The voltmeter 45 is configured to measure the voltage V of the capacitor 42 (hereinafter referred to as "capacitor voltage V") and is connected in parallel with the capacitor 42. The MCU 46 controls the inverter circuit 41 based on output requests for the drive motor 3 output from the ECU 10 and also controls the discharge switch 44 to turn on or off based on signals output from the ECU 10. Additionally, the MCU 46 sends the capacitor voltage V measured by the voltmeter 45 to the ECU 10.

The vehicle 1 of the present embodiment is further provided with an external charge port 5 for electrically connecting a device external to the vehicle 1 with the battery 2, and an auxiliary battery 6 that serves as the power source for the in-vehicle electrical components, including the contactors 21 to 23. In other words, the vehicle 1 of the present embodiment is a plug-in hybrid vehicle (PHEV) that allows for at least one of external charging or external power supply.

The external charge port 5 is, for example, an outlet for charging the battery 2 with an external charger and is connected to the high-voltage circuit of the battery 2 so as to be in parallel with the inverter 4. A connection detection sensor 51 for detecting whether or not a charging gun of an external charger has been connected to the external charge port 5 is provided near the external charge port 5. The connection detection sensor 51 is, for example, a voltage sensor for detecting the connection of the charging gun to the external charge port 5.

The auxiliary battery 6 is a secondary battery with a lower voltage than the voltage of the battery 2. The auxiliary battery 6 is connected to the high-voltage circuit of the battery 2 via the DCDC converter 7 so as to be in parallel with the inverter 4. The DCDC converter 7 is, for example, a step-down transformer that steps down the voltage when the auxiliary battery 6 is charged by the battery 2. The operation of the DCDC converter 7 is controlled by the ECU 10. The auxiliary battery 6 is provided with a battery management unit (BMU) 61 that manages the state of the auxiliary battery 6. The BMU 61 calculates the state of charge (hereinafter, referred to as "SOC") of the auxiliary battery 6 from the voltage, current, and the like of the auxiliary battery 6 and sends the calculated SOC to the ECU 10. Alternatively, the ECU 10 may have the function to manage the state of the auxiliary battery 6, so that the ECU 10 calculates the SOC of the auxiliary battery 6.

The ECU 10 is an electronic controller configured as an LSI device or embedded electronic device integrating a microprocessor, a ROM, RAM, etc., and is connected to a communication line for the network of the vehicle 1. On the input side of the ECU 10, in addition to the MCU 46, the BMU 61, and the connection detection sensor 51 described above, a main power switch 8 (power switch or engine switch) is connected. The main power switch 8 sends information (signal) to the ECU 10 indicating the main power switch 8 has been turned on or off by the user. On the output side of the ECU 10, the contactors 21 to 23, the MCU 46, and the DCDC converter 7 are connected.

2. OVERVIEW OF CONTROL

As described above, the ECU 10 determines whether at least one of the contactors 21 to 23 is likely to have sticking or not after the high-voltage circuit of the battery 2 is used. In the present embodiment, the ECU 10 determines whether the first contactor 21 is likely to have sticking or not. Hereinafter, the first contactor 21 is also referred to as the "target contactor 21". The determination as to whether the target contactor 21 is likely to have sticking or not is made, for example, based on whether the target contactor 21 has a short circuit or not. Here, the term "short circuit" refers to a state in which the movable contact and the fixed contact of the contactors 21 to 23 are brought into contact regardless of on or off instructions, or a state in which the conduction of the lines (circuit) where the contactors 21 to 23 are interposed cannot be shut regardless of on and off instructions to the contactors 21 to 23. Hereafter, this control for determining whether the target contactor 21 is likely to have sticking or not is referred to as "sticking determination control".

Here, the causes of the short circuit of the contactors 21 to 23 include factors other than the sticking in the contactors 21 to 23. For example, other causes include cases where the movable contact and the fixed contact of a contactor 21 to 23 are temporarily come into contact due to a misalignment of parts within the contactor 21 to 23, or the displacement of the movable contact of a contactor 21 to 23 is hindered temporarily due to thermal expansion of the electromagnetic coil of the contactor 21 to 23. Such transient short-circuiting in the contactors 21 to 23 can be removed if the cause of the short circuit is eliminated. For example, in the case of a short circuit caused by a misalignment, the short-circuiting can be removed once the parts within the contactors 21 to 23 return to their original (normal) positions. Additionally, in the case of a short circuit caused by a thermal expansion of the electromagnetic coil, the short-circuiting can be removed because the electromagnetic coil contracts once the electromagnetic coil cools down.

Accordingly, if the sticking determination control determines that the target contactor 21 is likely to have sticking, the ECU 10 performs controls to remove a transient short circuit in the contactor as described above. Specifically, a vibration control is performed as the control to remove a short circuit caused by a misalignment described above. Additionally, an off control is performed as the control to remove a short circuit caused by a thermal expansion of the electromagnetic coil described above.

In this manner, the ECU 10 does not simply determine whether the target contactor 21 is likely to have a sticking failure or not based on whether the target contactor 21 has a short circuit or not, but also performs the controls to remove a transient short circuit. This prevents the lines downstream to the contactors 21 to 23 from remaining in a high-voltage state (exposure of live wires) after the high-voltage circuit is used. Specifically, the ECU 10 performs, as processes after the use of the high-voltage circuit, the following four types of control if necessary, including the sticking determination control, the vibration control, and the off control described above.

(1) Sticking determination control
(2) Vibration control
(3) Voltage equalization control
(4) Off control Furthermore, in response to receiving a start signal requesting the start of the vehicle 1 while the vibration control or the off control is being performed, the ECU 10 stops the vibration control or the off control and performs the start control to make the vehicle 1 ready for driving. The start signal is generated, for example, when the user turns on the main power switch 8, resulting in an on signal output from the main power switch 8, or when a signal indicating the need for the vehicle 1 to start driving is generated through autonomous driving without interventions by the user (for example, in an emergency).

As described above, the sticking determination control is the control to determine whether the target contactor 21 is likely to have sticking or not. In the present embodiment, the ECU 10 performs this sticking determination control after the high-voltage circuit is used, after the vibration control is performed, and after the off control is performed.

In the sticking determination control, the ECU 10 opens the line Lp where the target contactor 21 is interposed for a given determination time duration Tj and controls the discharge resistor 43 to connect to the high-voltage circuit, thereby discharging the capacitor 42. Then, the ECU 10 determines whether the target contactor 21 is likely to have sticking or not by detecting the capacitor voltage V after the determination time duration Tj has elapsed. The determination time duration Tj is set to be longer than a certain time duration (about one second) required for the capacitor 42 to discharge and is set, for example, to 2 to 20 seconds, taking into account the variation in components (such as the capacitor 42 and the discharge resistor 43) related to the discharge of the capacitor 42.

More specifically, the voltage of the capacitor 42 has a value equivalent to the voltage of the battery 2 (battery voltage Vb) immediately after the high-voltage circuit is used. In the sticking determination control, the ECU 10 stops sending control signals to the first contactor 21 and the precharge contactor 23 on the positive side so that the contactors 21, 23 are turned off, and controls the discharge switch 44 via the MCU 46 to be on during the determination time duration Tj. While the sticking determination control is being performed, the ECU 10 maintains to send a control signal to keep the second contactor 22 on the negative side to turn on.

Here, if the first contactor 21 and the precharge contactor 23 are not short-circuited (if they are normal), the positive line Lp is open, so the charge stored in the capacitor 42 is discharged by the discharge resistor 43, causing the capacitor voltage V to decrease. On the other hand, if at least one of the first contactor 21 and the precharge contactor 23 is short-circuited, the high-voltage circuit remains closed even though control signals to the first contactor 21 and the precharge contactor 23 are stopped. As a result, the charge stored in the capacitor 42 does not discharge, and the capacitor voltage V remains at the battery voltage Vb.

If the capacitor voltage V becomes equal to or lower than a given determination threshold Vth after the elapse of the determination time duration Tj, the ECU 10 determines that the target contactor 21 does not have sticking, in other words, the contactor is normal. Or, if the capacitor voltage V is greater than the determination threshold Vth after the elapse of the determination time duration Tj, the ECU 10 determines that the target contactor 21 is likely to have sticking. The determination threshold Vth is set, for example, to a value higher than the capacitor voltage V that is expected after the elapse of the determination time duration Tj if the capacitor 42 discharges normally, but lower than the battery voltage Vb.

As described above, the vibration control is the control performed when the sticking determination control determines that the target contactor 21 is likely to have sticking, and is the control to attempt to remove a transient short circuit caused by a misalignment of the target contactor 21. In the vibration control, the ECU 10 performs a target vibration control by sending control signals intermittently to the target contactor 21 to turn the target contactor 21 on and off repeatedly. The ECU 10 performs the target vibration control in this manner to attempt to remove the transient short circuit caused by a misalignment of the target contactor 21 by intermittently providing electrical control signals to the target contactor 21. The ECU 10 also attempts to eliminate a positional misalignment of the parts within the target contactor 21 by causing the movable contact of the target contactor 21 to physically vibrate.

Additionally, the ECU 10 of the present embodiment performs a non-target vibration control as the vibration control by sending control signals intermittently to the precharge contactor 23 to turn the precharge contactor 23 on and off repeatedly. The non-target vibration control is performed before the target vibration control is performed. By performing the non-target vibration control in this manner, the ECU 10 causes the precharge contactor 23 to vibrate to attempt to remove a misalignment in the target contactor 21 through the vibration. The vibration of the precharge contactor 23 is transmitted to the target contactor 21 via, for example, busbars and harnesses (none of which are illustrated) provided in the high-voltage circuit. If the precharge contactor 23 is adjacent to the target contactor 21, the vibration of the precharge contactor 23 can be directly transmitted to the target contactor 21.

The ECU 10 of the present embodiment keeps the first contactor 21 turned on while performing the non-target vibration control and keeps the precharge contactor 23 turned on while performing the target vibration control. Furthermore, the ECU 10 keeps the second contactor 22 turned on while performing the vibration control. In this manner, the ECU 10 maintains the voltage of the high-voltage circuit (the voltage on the capacitor 42 side) to a value equivalent to the battery voltage Vb by repeatedly turning one of the two parallel-connected contacts 21, 23 on and off while keeping the other turned on. This prevents the one contactor 21, 23, which is repeatedly turned on and off, from sticking due to an inrush current when it is turned on and off. Furthermore, the sticking determination control after the vibration control can be performed efficiently. During the vibration control, the ECU 10 controls the discharge switch 44 to turn off.

The voltage equalization control is a control performed before the vibration control is performed and is a control to equalize the voltage of the capacitor 42 with that of the battery 2. This voltage equalization control is performed to prevent the inflow of an inrush current to the high-voltage circuit during the subsequent vibration control, if the ECU 10 mistakenly determines that "sticking is likely to be present" even though the capacitor 42 has been successfully discharged in the sticking determination control. The causes of such an incorrect determination include, for example, abnormalities associated with electrical signals, such as errors in the ECU 10 or a failure of the voltmeter 45.

In the voltage equalization control, the ECU 10 controls the second contactor 22 and the precharge contactor 23 to turn on and the first contactor 21 to turn off, and also controls the discharge switch 44 to turn off, during the given voltage equalization time duration Tep. The voltage equalization time duration Tep is the time duration required to charge the capacitor 42, and is set to several hundred milliseconds to one second, for example.

The off control is performed when it is determined that the target contactor 21 is likely to have sticking as a result of a determination in the sticking determination control performed after the vibration control. As described above, the off control is a control to attempt to remove a transient short circuit caused by a thermal expansion of the electromagnetic coil of the target contactor 21. In the off control, the ECU 10 prohibits (stops) sending control signals to the target contactor 21 for a given off time duration Toff (a given period of time), thereby prohibiting the excitation of the electromagnetic coil of the target contactor 21. The ECU 10 prohibits conduction of a current (conduction of a current on the excitation side) to the target contactor 21 during the off time duration Toff in this manner to cool the electromagnetic coil of the target contactor 21 in an attempt to remove a transient short circuit. Here, the off time duration Toff is the time duration required for the thermally expanded electromagnetic coil of the target contactor 21 to cool to the temperature equivalent to the temperature of the outside air and is set to, for example, 1 to 2 hours.

Since the time to perform the off control is longer than the time to perform the other controls, a start signal requesting the start of driving as described above may be input while the off control is being performed. The ECU 10 of the present embodiment keeps the second contactor 22 and the precharge contactor 23 turned on while the off control is being performed, and stops the off control in response to an input of a start signal. In other words, the ECU 10 controls the second contactor 22 and the precharge contactor 23 as described above to enable the vehicle 1 to be ready for driving quickly after the off control is stopped. Furthermore, the sticking determination control after the off control can be efficiently performed. Note that the ECU 10 controls the discharge switch 44 to turn off while the off control is being performed.

Furthermore, the ECU 10 of the present embodiment activates the DCDC converter 7 to charge the auxiliary battery 6 when the SOC of the auxiliary battery 6 becomes equal to or lower than a given lower limit value TH while the off control is being performed. Here, the lower limit value TH is set to a value greater than zero and enabling at least the amount of electric power required to start various in-vehicle electrical devices to be output when the high-voltage circuit is started to be used. By performing the control in such a manner, the ECU 10 prevents the depletion of the auxiliary battery 6 while the off control is being performed.

As described above, the start control is the control to make the vehicle 1 ready for driving after the vibration control or the off control is stopped. In the start control, the ECU 10 outputs control signals to the second contactor 22 and the precharge contactor 23 to turn them on, and turns off the discharge switch 44. Slightly after that, the ECU 10 outputs a control signal to the first contactor 21. Additionally, the ECU 10 turns off the precharge contactor 23 by stopping the control signal to the precharge contactor 23 after the startup time duration Tsu has elapsed after turning on the precharge contactor 23. As a result, the inverter 4 and the drive motor 3 are made ready for operating, in other words, the vehicle 1 is made ready for driving.

Note that the ECU 10 may stop the vibration control or the off control and perform the above-mentioned start control in response to receiving a signal from the connection detection sensor 51 indicating that a charging gun of an external charger has been connected to the external charge port 5 while the vibration control or the off control is being performed. The ECU 10 performs the start control, which allows the high-voltage circuit to charge the battery 2 from the external charger.

3. CONFIGURATION OF CONTROL

As illustrated in FIG. 2, the ECU 10 includes a determination unit 11, a voltage equalization control unit 12, a vibration control unit 13, a re-determination unit 14, an off control unit 15, a final determination unit 16, a stop instruction unit 17, and a start control unit (driving control unit) 18, as elements for performing the above-mentioned controls. These elements represent the functions of the ECU 10 by categorizing the functions for convenience. The elements may be embodied by electronic circuits (hardware), may be programmed into software, or may be embodied by a combination of both, in which case, some of the functions are embodied by hardware and others by software.

The determination unit 11 is configured to perform the sticking determination control described above after the high-voltage circuit is used. Specifically, the determination unit 11 controls each contactor 21 to 23 and the discharge switch 44 as described above for the determination time duration Tj. After the determination time duration Tj has elapsed, the determination unit 11 obtains the capacitor voltage V from the voltmeter 45 via the MCU 46. If the obtained voltage V is equal to or lower than the determination threshold Vth, the determination unit 11 determines that the target contactor 21 is normal and turns off all of the contactors 21 to 23. On the other hand, if the voltage V is higher than the threshold Vth, the determination unit 11 determines that the target contactor 21 is likely to have sticking and sends the determination result to the voltage equalization control unit 12 and the vibration control unit 13.

The voltage equalization control unit 12 is configured to perform the voltage equalization control described above in response to receiving the determination result from the determination unit 11. Specifically, the voltage equalization control unit 12 controls each contactor 21 to 23 and the discharge switch 44 as described above for the voltage equalization time duration Tep, and notifies the vibration control unit 13 of the completion of the voltage equalization control after the elapse of the voltage equalization time duration Tep.

The vibration control unit 13 is configured to perform the vibration control described above in response to receiving the determination result from the determination unit 11 and receiving the completion signal of the voltage equalization control from the voltage equalization control unit 12. Specifically, the vibration control unit 13 performs the non-target vibration control and the target vibration control in this order as the vibration control described above. In the non-target vibration control, the vibration control unit 13 repeatedly turns the precharge contactor 23 on and off a given number of times (for example, several tens of times) and controls the first contactor 21, the second contactor 22, and the discharge switch 44 as described above. Furthermore, in the target vibration control, the vibration control unit 13 repeatedly turns the first contactor 21 on and off a given number of times (for example, several tens of times) and controls the second contactor 22, the precharge contactor 23, and the discharge switch 44 as described above. After the completion of the vibration control, the vibration control unit 13 notifies the re-determination unit 14 of the completion of the vibration control. In addition, the vibration control unit 13 stops the vibration control in response to receiving a stop instruction from the stop instruction unit 17.

The re-determination unit 14 is configured to perform the sticking determination control described above in response to receiving the completion signal of the vibration control from the vibration control unit 13, in the same manner as the determination unit 11. If the voltage V obtained after the determination time duration Tj has elapsed is equal to or lower than the determination threshold value Vth, the re-determination unit 14 determines that the target contactor 21 is normal and turns off all of the contactors 21 to 23. On the other hand, if the voltage V is higher than the threshold Vth, the re-determination unit 14 determines that the target contactor 21 is likely to have sticking and sends the determination result to the off control unit 15.

The off control unit 15 is configured to perform the off control described above in response to receiving the determination result from the re-determination unit 14. Specifically, the off control unit 15 controls each contactor 21 to 23 and the discharge switch 44 as described above. Additionally, the off control unit 15 obtains the SOC of the auxiliary battery 6 from the BMU 61 and controls the DCDC converter 7 as described above if the SOC of the auxiliary battery 6 becomes equal to or lower than the lower limit value TH, while the off control is being performed. After the off control is completed, the off control unit 15 notifies the final determination unit 16 of the completion of the off control. Additionally, the off control unit 15 stops the off control described above in response to receiving a stop instruction from the stop instruction unit 17.

The final determination unit 16 is configured to perform the sticking determination control in response to receiving the completion signal of the off control from the off control unit 15, in the same manner as the determination unit 11 and the re-determination unit 14. If the voltage V obtained after the determination time duration Tj has elapsed is equal to or lower than the threshold Vth, the final determination unit 16 determines that the target contactor 21 is normal and turns off all of the contactors 21 to 23. On the other hand, if the voltage V is higher than the threshold Vth, the final determination unit 16 determines that the target contactor 21 has a sticking failure. If the final determination unit 16 determines that the target contactor 21 has a sticking failure, it turns off all of the contactors 21 to 23 and executes a fail-safe process for the vehicle 1. The final determination unit 16 may prohibit the vehicle 1 from being ready for driving or may activate an in-vehicle alarm device that is not illustrated, when executing the fail-safe process.

The stop instruction unit 17 is configured to send a stop instruction of the vibration control or a stop instruction of the off control to the vibration control unit 13 or the off control unit 15. The stop instruction unit 17 sends a stop instruction to the vibration control unit 13 in response to receiving the start signal described above while the vibration control is being performed, or sends a stop instruction to the off control unit 15 in response to receiving the start signal described above while the off control is being performed. Additionally, in response to receiving a signal indicating that a charging gun of an external charger has been connected to the external charge port 5 while the vibration control or the off control is being performed, the stop instruction unit 17 of the present embodiment also sends a stop instruction to the vibration control unit 13 or the off control unit 15. When sending the stop instruction, the stop instruction unit 17 sends, to the start control unit 18, a signal indicating the transmission of the stop instruction.

The start control unit 18 is configured to perform the start control by controlling each contactor 21 to 23 and the discharge switch 44 as described above, in response to receiving a signal from the stop instruction unit 17. After the completion of the start control, the start control unit 18 drives the drive motor 3 by controlling the inverter circuit 41 via the MCU 46, allowing the vehicle 1 to drive according to an operation by the user.

4. FLOWCHARTS

Figure 3:
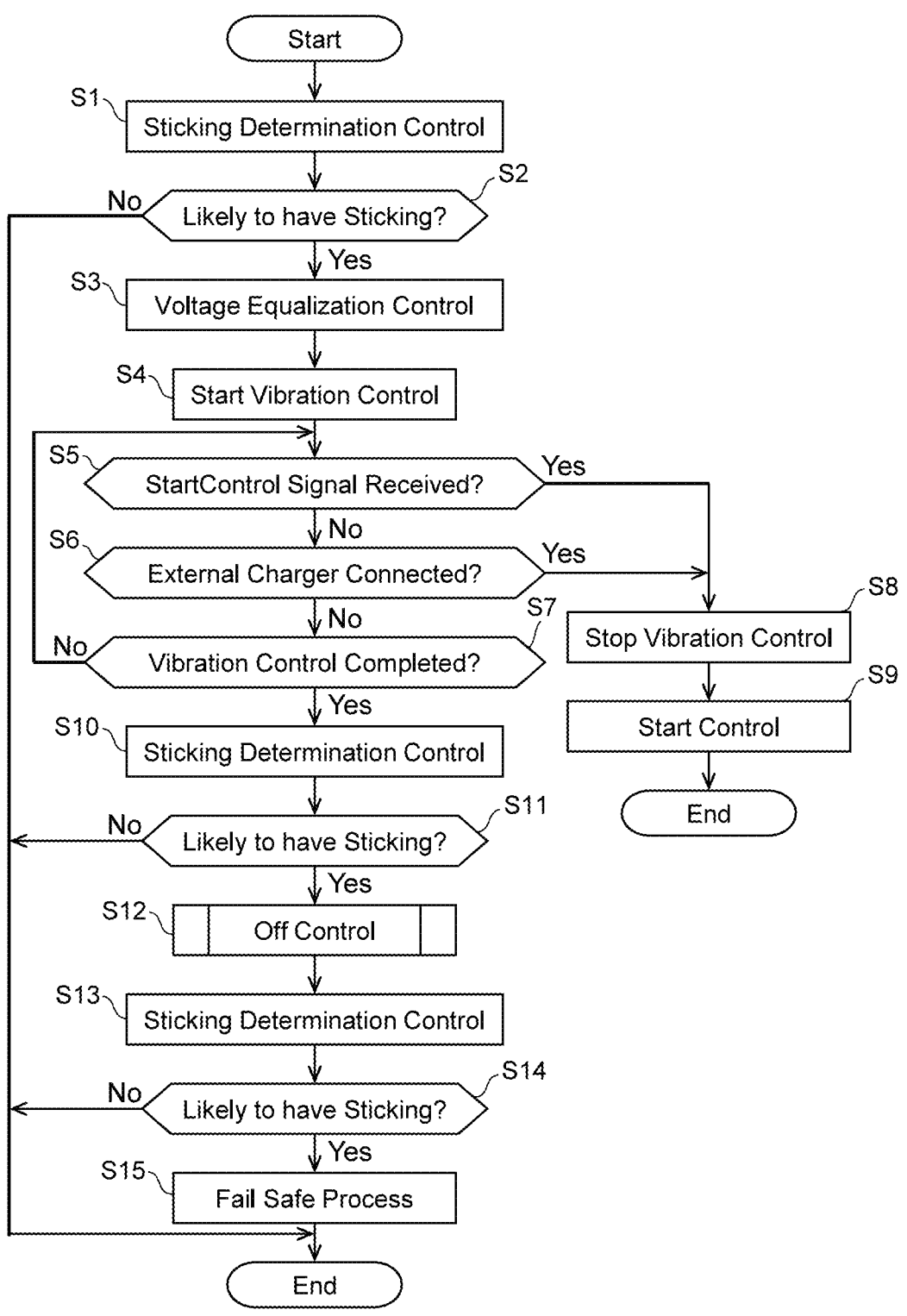
FIG. 3 is a flowchart for explaining a process after the use of the high-voltage circuit performed in the in-vehicle control device of FIG. 1.
Figure 4:
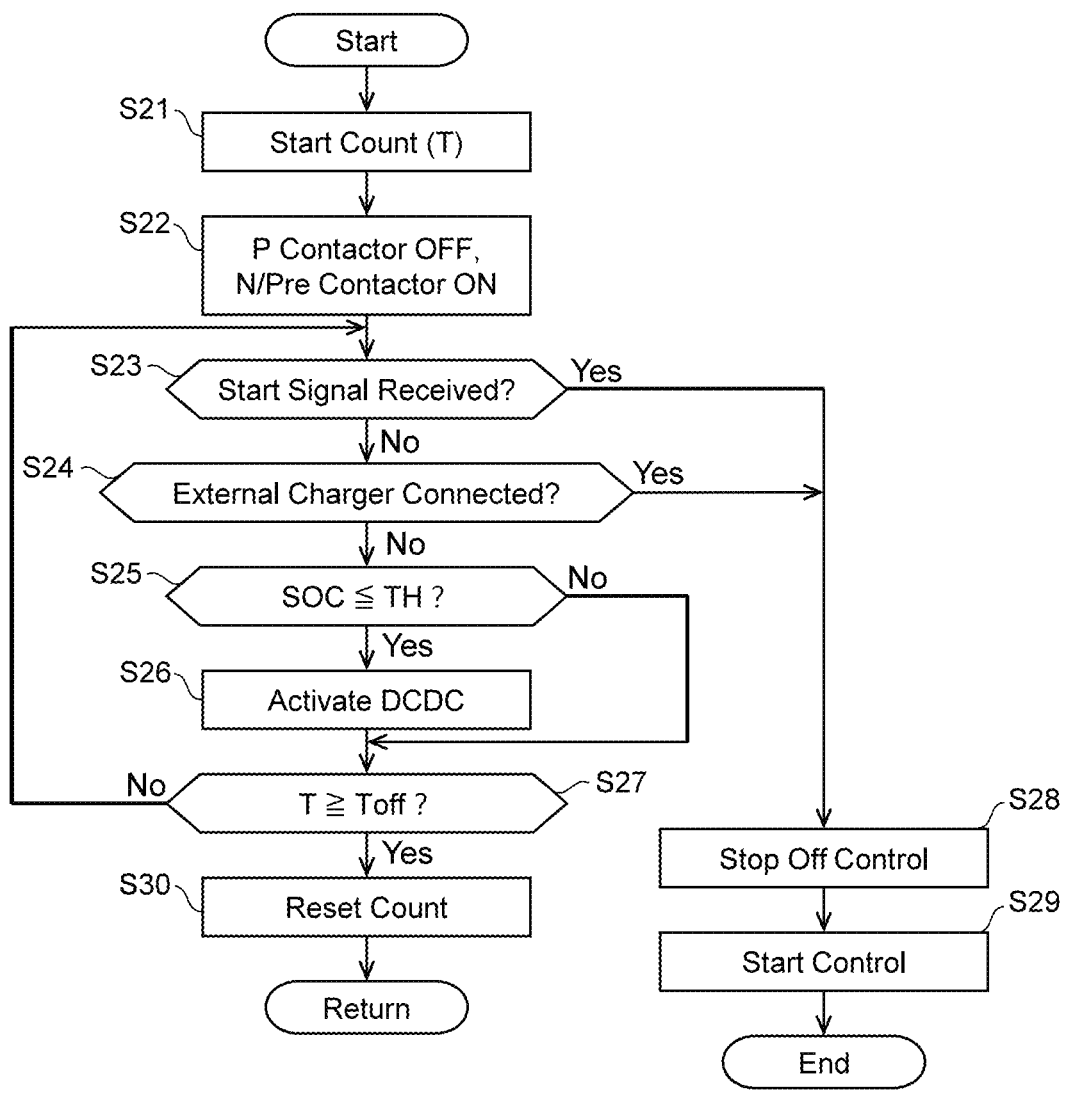
FIG. 4 is a flowchart for explaining an off control performed in FIG. 3.

FIGS. 3 and 4 are example flowcharts used to explain processes performed by the ECU 10 after the high-voltage circuit is used. These flowcharts are executed, for example, when the main power switch 8 is turned off or when an external charger is disconnected from the external charge port 5, after the use of the high-voltage circuit.

In Step S1, the sticking determination control described above is performed, and the flow proceeds to Step S2. In Step S2, it is determined whether the target contactor 21 is likely to have sticking or not. If it is determined in Step S2 that the target contactor 21 is not likely to have sticking, the target contactor 21 is determined to be normal and this flow ends. On the other hand, if it is determined in Step S2 that the target contactor 21 is likely to have sticking, the flow proceeds to Step S3.

In Step S3, the voltage equalization control described above is performed. In the subsequent Step S4, the vibration control described above is started, and the flow proceeds to Step S5. In Step S5, it is determined whether or not a start signal requesting the vehicle 1 to start driving is received. If no start signal is received, it is determined in the subsequent Step S6 whether or not a charging gun of an external charger has been connected to the external charge port 5. If a charging gun has not been connected, the determinations of neither Step S5 nor Step S6 are satisfied, so the flow proceeds to Step S7, where it is determined whether or not the vibration control has been completed. If it is determined in Step S7 that the vibration control has not been completed, the flow returns to Step S5, and the determinations of Steps S5 and S6 are repeated until vibration control is determined to be completed in Step S7.

On the other hand, if it is determined in Step S5 that a start signal requesting the vehicle 1 to start driving has been received, or if it is determined in Step S6 that a charging gun of an external charger has been connected to the external charge port 5, the flow proceeds to Step S8, where the vibration control is stopped. The flow then proceeds to Step S9, where the start control described above is performed and this flow ends.

When the vibration control has been completed without the determination of either Step S5 or Step S6 being satisfied, the determination of Step S7 is satisfied and the flow proceeds to Step S10. In Step S10, the sticking determination control is performed again. Then, the flow proceeds to Step S11, where whether the target contactor 21 is likely to have sticking or not is determined again. If it is determined in Step S11 that the target contactor 21 is not likely to have sticking, the target contactor 21 is determined to be normal after the transient short-circuiting caused by a misalignment has been removed and this flow ends. On the other hand, if it is determined in Step S11 that the target contactor 21 is likely to have sticking, the flow proceeds to Step S12.

In Step S12, the process from Steps S21 to S30 in FIG. 4 is executed as the execution of the off control described above. Specifically, in Step S21, the count T of a timer built into the ECU 10 is started as the start of the off control, and the flow proceeds to Step S22, where the first contactor 21 (P contactor) is turned off and the second contactor 22 (N contactor) and the precharge contactor 23 (Pre contactor) are turned on. In the subsequent Step S23, it is determined whether or not a start signal requesting the vehicle 1 to start driving has been received. If a start signal has not been received, in the subsequent Step S24, it is determined whether or not a charging gun of an external charger has been connected to the external charge port 5.

If it is determined in Step S23 that a start signal requesting the vehicle 1 to start driving has been received, or if it is determined in Step S24 that a charging gun of an external charger has been connected to the external charge port 5, the flow proceeds to Step S28, where the off control is stopped. The flow then proceeds to Step S29, where the start control described above is performed and this flow ends.

On the other hand, if neither a start signal has been received nor a charging gun has been connected, the determinations of neither Step S23 nor Step S24 are satisfied, so the flow proceeds to Step S25, where it is determined whether or not the SOC of the auxiliary battery 6 becomes equal to or lower than the lower limit value TH. If it is determined in Step S25 that the SOC of the auxiliary battery 6 is higher than the lower limit value TH, the flow proceeds to Step S27. On the other hand, if it is determined in Step S25 that the SOC of the auxiliary battery 6 is equal to or lower than the lower limit value TH, the DCDC converter 7 is activated in Step S26 and the flow proceeds to Step S27.

In Step S27, it is determined whether or not the count T is longer than or equal to the off time duration Toff. If it is determined in Step S27 that the count T is shorter than the off time duration Toff, the flow returns to Step S23, and the processes of Steps S23 to S26 are repeated until the determination in Step S27 is satisfied. Once the determination in Step S27 is satisfied, the count T is reset in Step S30, this process returns, and the flow proceeds to Step S13 in FIG. 3.

In Step S13, the final sticking determination control is performed. Then, the flow proceeds to Step S14, where a final determination is made as to whether the target contactor 21 is likely to have sticking or not. If it is determined in Step S14 that the target contactor 21 is not likely to have sticking, it is determined that a transient short circuit state caused by a thermal expansion has been removed and so that the target contactor 21 is to be normal and this flow ends. On the other hand, if the final determination that the target contactor 21 is likely to have sticking is made in Step S14, it is determined that the target contactor 21 has a sticking failure, the fail-safe process for the vehicle 1 is executed in Step S15, and this flow ends.

5. TIME CHART

Figure 5:
FIG. 5 is an example of a time chart illustrating the effects of the in-vehicle control device of FIG. 1.

Referring to FIG. 5, the effects of the ECU 10 is explained. The horizontal axis represents time in the time chart in FIG. 5. In FIG. 5, for example, it is assumed that the use of the high-voltage circuit is ended at time to when the main power switch 8 is turned off.

In the ECU 10, following the end of the use of the high-voltage circuit at time t0, the sticking determination control (P sticking determination) is performed from time t1 until the determination time duration Tj elapses as the first process after the use of the high-voltage circuit. In the sticking determination control, the first contactor 21 (P contactor) and the precharge contactor 23 (Pre contactor) on the positive side are controlled to be off, and the second contactor 22 (N contactor) is controlled to be on.

If both the first contactor 21 and the precharge contactor 23 are not short-circuited at this time, the capacitor voltage V gradually decreases from time t1 to time t2 after the elapse of the determination time duration Tj due to the discharge of the capacitor 42, falling below the determination threshold Vth as indicated by the dashed line in FIG. 5. In the ECU 10, it is determined that the target contactor 21 is normal based on the fact that the capacitor voltage V becomes equal to or lower than the determination threshold Vth at time t2.

On the other hand, if at least one of the first contactor 21 and the precharge contactor 23 is short-circuited, the capacitor 42 is not discharged. Hence, the capacitor voltage V is not lower than the determination threshold Vth, remaining near the battery voltage Vb from time t1 to time t2, as indicated by the solid line in FIG. 5. In the ECU 10, it is determined that the target contactor 21 is likely to have sticking based on the fact that the capacitor voltage V is higher than the determination threshold Vth at time t2.

If it is determined that the target contactor 21 is likely to have sticking, in the ECU 10, the voltage equalization control is performed from time t2 until the voltage equalization time duration Tep has elapsed. In the voltage equalization control, the precharge contactor 23 is controlled to be on while the first contactor 21 remains of and the second contactor 22 remains on.

As described above, if at least one of the first contactor 21 and the precharge contactor 23 is short-circuited, the capacitor 42 is not discharged during the sticking determination control performed previously. Thus, the capacitor voltage V maintains near the battery voltage Vb at time t2. Consequently, as indicated by the solid line in FIG. 5, the capacitor voltage V remains near the battery voltage Vb without any change from time t2 to time t3 after the elapse of the voltage equalization time duration Tep.

In the meantime, the ECU 10 may erroneously determine that "sticking is likely to be present" even though the actual voltage V of the capacitor 42 approaches near zero at time t2 due to abnormality associated with electrical signals. In this case, the capacitor voltage V is charged to near the battery voltage Vb because the capacitor 42 is charged from time t2 to time t3 as a result of the voltage equalization control, as indicated by the two-dot chain line in FIG. 5. This prevents an inrush current from flowing to the high-voltage circuit when the subsequent vibration control is started.

At time t3 after performing the voltage equalization control, the vibration control is started in the ECU 10. In the vibration control, the non-target vibration control and the target vibration control are performed in this order. In the non-target vibration control, the precharge contactor 23 is repeatedly turned on and off, causing the vibration of the precharge contactor 23 to be transmitted to the first contactor 21, thereby attempting to remove a short circuit caused by a misalignment of the first contactor 21. Furthermore, if the determination result of the sticking determination control performed previously was caused by a short circuit in the precharge contactor 23, removal of a short circuit caused by a misalignment of the precharge contactor 23 is attempted.

In the target vibration control, the first contactor 21 is repeatedly turned on and off. Such an intermittent application of electrical control signals to the target contactor 21 is used to attempt to remove the transient short circuit caused by a misalignment of the target contactor 21. Additionally, physical vibrations of the movable contact in the first contactor 21 are also used to attempt to remove the short circuit caused by a misalignment of the first contactor 21. Furthermore, if the determination result of the sticking determination control performed previously was caused by a short circuit in the precharge contactor 23, the vibration of the first contactor 21 is transmitted to the precharge contactor 23 to attempt to remove a short circuit caused by a misalignment of the precharge contactor 23.

Additionally, in the vibration control, the first contactor 21 is controlled to be on during the non-target vibration control and the precharge contactor 23 is controlled to be on during the target vibration control, while the second contactor 22 remains on. This remains the capacitor voltage V near the battery voltage Vb as indicated by the solid line in FIG. 5, preventing sticking of one of the contactors 21, 23 repeatedly turned on and off and allowing efficient execution of the subsequent sticking determination control. Note that the vibration control attempts to remove not only a misalignment of the first contactor 21 or the precharge contactor 23 but also a short circuit in the contactors 21, 23 caused by mild sticking.

At time t4 after performing the vibration control, the sticking determination control is performed again in the ECU 10. At this time, if a short circuit in the target contactor 21 (or the precharge contactor 23 or both) has been removed by the vibration control, the capacitor voltage V gradually decreases from time t4 to time t5 after the elapse of the determination time duration Tj, as indicated by the dashed line in FIG. 5. In the ECU 10, it is determined that the target contactor 21 is normal based on the fact that the capacitor voltage V becomes equal to or lower than the determination threshold Vth at time t5.

On the other hand, if the short circuit in at least one of the first contactor 21 and the precharge contactor 23 persists despite performing the vibration control, the capacitor voltage V remains near the battery voltage Vb, as indicated by the solid line in FIG. 5. Accordingly, it is determined in the ECU 10 that the target contactor 21 is likely to have sticking based on the fact that the capacitor voltage V is higher than the determination threshold Vth at time t5.

If it is determined that the target contactor 21 is likely to have sticking at time 15, the off control is performed in the ECU 10 from time t5 until the off time duration Toff has elapsed. In the off control, the first contactor 21 is controlled to be off until the off time duration Toff elapses, thereby prohibiting current conduction to the first contactor 21. As a result, if the electromagnetic coil of the target contactor 21 has had thermal expansion, the electromagnetic coil shrinks over time as it dissipates heat to cool to a temperature equivalent to the outside temperature. Hence, the displacement of the movable contact, which was obstructed by the thermally expanded electromagnetic coil, is allowed, attempting to remove a short circuit caused by a thermal expansion.

Additionally, in the off control, the second contactor 22 and the precharge contactor 23 are controlled to be on, maintaining the capacitor voltage V near the battery voltage Vb as indicated by the solid line in FIG. 5. Hence, the subsequent sticking determination control can be carried out efficiently.

Furthermore, in the off control, if the SOC of the auxiliary battery 6 becomes equal to or lower than the given lower limit value TH, the DCDC converter 7 is activated to charge the auxiliary battery 6, preventing the depletion of the auxiliary battery 6 while the off control is being performed. Furthermore, as described above, in the off control of the present embodiment, the second contactor 22 and the precharge contactor 23 are controlled to be on. Thus, since the capacitor voltage V is maintained near the battery voltage Vb, charging of the auxiliary battery 6 can be started quickly.

At time t6 after performing the off control, the final sticking determination control is performed in the ECU 10. At this time, if the short circuit in the target contactor 21 has been removed by the execution of the off control, the capacitor voltage V gradually decreases from time t6 to time t7 after the elapse of the determination time duration Tj, as indicated by the dashed line in FIG. 5. It is determined in the ECU 10 that the target contactor 21 is normal based on the fact that the capacitor voltage V becomes equal to or lower than the determination threshold Vth at time t7.

On the other hand, if the short circuit in at least one of the first contactor 21 and the precharge contactor 23 persists despite performing the off control, the capacitor voltage V remains near the battery voltage Vb, as indicated by the solid line in FIG. 5. Thus, it is determined in the ECU 10 that the target contactor 21 has a sticking failure based on the fact that the capacitor voltage V is greater than the determination threshold Vth at time t7, and the fail-safe process is performed.

6. ADVANTAGES (1) According to the aforementioned ECU 10, when it is determined that the target contactor 21 is likely to have sticking after the use of the high-voltage circuit, the vibration control is performed. Thus, it is possible to attempt to remove a transient short circuit caused by a misalignment in the target contactor 21. Additionally, by not only determining whether the target contactor 21 is likely to have sticking or not after the use of the high-voltage circuit but also performing the vibration control to attempt to remove a transient short circuit, an exposure of live wires after the use of the high-voltage circuit can be prevented. Furthermore, an unnecessary fail-safe that inhibits the vehicle 1 from operating can be avoided. Since the target vibration control included in the vibration control is directly applied to the target contactor 21, the provision of additional devices or parts to remove the transient short circuit is not required, thereby preventing complexity and cost increases of the vehicle 1.

(2) According to the aforementioned ECU 10, the non-target vibration control, which involves repeatedly turning the precharge contactor 23 on and off, is performed before the target vibration control. By performing the non-target vibration control that transmits vibration from outside the target contactor 21, it is possible to attempt to remove a transient short circuit caused by a misalignment even when the movable contact of the target contactor 21 barely moves due to the positional misalignment despite repeated turning on and off of the target contactor 21. Furthermore, since the non-target vibration control is targeted to the existing precharge contactor 23, the provision of additional devices or parts to remove the transient short circuit is not required, thereby preventing complexity and cost increases of the vehicle 1. Furthermore, by performing both the target vibration control and the non-target vibration control, it is possible to attempt to remove a transient short circuit caused by misalignments in both the target contactor 21 and the precharge contactor 23.

(3) According to the aforementioned ECU 10, since the voltage equalization control is performed before performing the vibration control, an inrush current at the start of the vibration control is suppressed even if the determination result of the sticking determination control before the vibration control was an incorrect determination. Accordingly, the high-voltage circuit can be protected.

(4) The vibration control unit 13 controls the first contactor 21 to be on while the non-target vibration control is being performed, and controls the precharge contactor 23 to be on while the target vibration control is being performed. Additionally, the ECU 10 determines whether the target contactor 21 is likely to have sticking or not again after performing the vibration control. This prevents the capacitor voltage V from dropping, eliminating the need to recharge the capacitor 42 for the subsequent sticking determination control, allowing efficient execution of the subsequent sticking determination control.

(5) According to the aforementioned ECU 10, if it is again determined that the target contactor 21 is likely to have sticking in the subsequent sticking determination control after performing the vibration control, the off control is performed. Hence, it is possible to attempt to remove a transient short circuit caused by the reason different from a misalignment of the target contactor 21, namely, thermal expansion of the excitation coil. Additionally, since current conduction to the target contactor 21 is prohibited during the off time duration Toff to attempt to remove the transient short circuit in the off control, the provision of additional devices or parts to remove the transient short circuit is not required, thereby preventing complexity and cost increases of the vehicle 1.

(6) According to the aforementioned ECU 10, in response to receiving a start signal requesting the start of the vehicle 1, the vibration control or the off control is stopped even though the control is being performed, and the start control unit 18 makes the vehicle 1 ready for driving. This improves the convenience of the vehicle 1 by preventing the vehicle 1 from becoming immobile when the vehicle 1 must be moved in emergencies or when the vehicle 1 is temporarily parked in a service area, etc.

7. MODIFICATIONS

The configuration of the ECU 10 and the controls performed by the ECU 10 described above are examples. The target contactor for determining whether it is likely to have sticking after the use of the high-voltage circuit is not limited to the first contactor 21; the target contactor may be the second contactor 22 or the precharge contactor 23. Additionally, the ECU 10 may perform the above-mentioned controls on all of the contactors provided in the high-voltage circuit after the use of the high-voltage circuit.

Furthermore, the contactors 21 to 23 may be disposed either inside or outside the case that houses the battery 2. The precharge contactor 23 may be connected in parallel with the second contactor 22. Additionally, the high-voltage circuit may also have two precharge contactors 23, one connected in parallel with the first contactor 21 and the other connected in parallel with the second contactor 22.

Among the elements 11 to 18 provided in the above-mentioned ECU 10, the voltage equalization control unit 12, the re-determination unit 14, the off control unit 15, the final determination unit 16, the stop instruction unit 17, and the start control unit 18 may be omitted. In other words, the ECU 10 may be configured not to stop the vibration control or the off control while the control is being performed, may be configured not to perform the off control, or may be configured not to perform the voltage equalization control before the vibration control. For example, if the voltage equalization control unit 12 is omitted, the determination unit 11 only needs to send the determination result to the vibration control unit 13, and the vibration control unit 13 may perform the vibration control in response to receiving the determination result. Additionally, the determination as to whether sticking is likely to be present or not may not be made multiple times.

It is sufficient to perform at least the target vibration control in the vibration control, and the non-target vibration control may be omitted. Additionally, the vibration control unit 13 may perform the vibration control multiple times. In this case, it is possible to attempt to remove a transient short circuit caused by a misalignment in the target contactor 21 more reliably. Furthermore, in the ECU 10, the vibration control may be performed again by the vibration control unit 13 after the sticking determination control by the re-determination unit 14. By retrying the vibration control in this manner, it is possible to attempt to remove a transient short circuit caused by a misalignment in the target contactor 21 more reliably.

DESCRIPTION OF REFERENCE SYMBOLS

1 Vehicle
2 Battery
10 ECU (in-vehicle control device)
11 Determination unit
12 Voltage equalization control unit
13 Vibration control unit
15 Off control unit
18 Start control unit (driving control unit)
21 First contactor (target contactor)
22 Second contactor
23 Precharge contactor
24 Precharge resistor (resistor)
42 Smoothing capacitor (capacitor)
Toff Off time duration (given period of time)

The invention claimed is:
1. An in-vehicle control device comprising:
a determination unit that determines whether or not a target contactor for connecting and disconnecting a high-voltage circuit of a battery installed in a vehicle is likely to have sticking after the high-voltage circuit is used; and
a vibration control unit that performs a vibration control comprising a target vibration control to repeatedly turn on and off the target contactor when the determination unit determines that the target contactor is likely to have sticking,
wherein the high-voltage circuit comprises a first contactor interposed on one of positive or negative sides, a second contactor interposed on the other of the positive or negative sides, and a precharge contactor connected in parallel with the first contactor and in series with a resistor,
the vehicle comprises a capacitor connected to the battery via each of the first contactor and the second contactor,
the target contactor is the first contactor,
the vibration control comprises a non-target vibration control to repeatedly turn the precharge contactor on and off before the target vibration control is performed, and
the in-vehicle control device further comprises a voltage equalization control unit that equalizes a voltage of the capacitor with a voltage of the battery by turning on the precharge contactor before the vibration control unit performs the vibration control when the determination unit determines that the target contactor is likely to have sticking.
2. The in-vehicle control device according to claim 1, wherein the vibration control unit keeps the target contactor turned on while the non-target vibration control is being performed and keeps the precharge contactor turned on while the target vibration control is being performed, and
the determination unit determines again whether the target contactor is likely to have sticking or not after the vibration control unit performs the vibration control.
3. The in-vehicle control device according to claim 2, further comprising
an off control unit that performs an off control to prohibit current conduction to the target contactor for a given period of time, wherein the off control unit performs the off control when the determination unit determines again that the target contactor is likely to have sticking.

4. The in-vehicle control device according to claim 3, further comprising a driving control unit that makes the vehicle ready for driving in response to receiving a start signal requesting the vehicle to start driving, wherein the off control unit stops the off control in response to receiving the start signal, and the driving control unit makes the vehicle ready for driving after the off control is stopped and controls the vehicle according to an operation by the user.

5. The in-vehicle control device according to claim 1, wherein the vibration control unit performs the vibration control multiple times.

6. The in-vehicle control device according to claim 1, further comprising a driving control unit that makes the vehicle ready for driving in response to receiving a start signal requesting the vehicle to start driving, wherein the vibration control unit stops the vibration control in response to receiving the start signal, and the driving control unit makes the vehicle ready for driving after the vibration control is stopped and controls the vehicle according to an operation by a user.

\* \* \* \* \*